United States Patent
Rayes et al.

(10) Patent No.: US 7,151,884 B1
(45) Date of Patent: Dec. 19, 2006

(54) METHOD AND SYSTEM FOR RE-ESTABLISHING COMMUNICATION LINK IN A NETWORK BY USING VIRAL COMMUNICATION

(75) Inventors: Mark Ammar Rayes, San Ramon, CA (US); Michael Cheung, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 44 days.

(21) Appl. No.: 11/254,591

(22) Filed: Oct. 20, 2005

(51) Int. Cl.
*H04L 12/26* (2006.01)

(52) U.S. Cl. .................. 385/147; 370/216; 370/248; 370/254; 398/1; 398/9; 710/104

(58) Field of Classification Search ........... 370/216, 370/221, 241, 248, 252, 254–258; 398/1–3, 398/9, 10; 710/104, 105; 385/147
See application file for complete search history.

(56) References Cited

U.S. PATENT DOCUMENTS 6,510,381 B1 * 1/2003 Grounds et al. ............ 701/207
2002/0049783 A1 * 4/2002 Berk et al. ................ 707/500.1
2002/0172158 A1 * 11/2002 Hoefelmeyer et al. ...... 370/241
2004/0019657 A1 * 1/2004 Akiyama ................... 709/217
2004/0133721 A1 * 7/2004 Ellerbrock .................. 710/104
2005/0071530 A1    3/2005 Bandekar et al.
2005/0220007 A1 * 10/2005 Prigent et al. .............. 370/217

* cited by examiner

*Primary Examiner*—John D. Lee
(74) *Attorney, Agent, or Firm*—Trellis Intellectual Property Law Group, PC

(57) ABSTRACT

A method and a system for re-establishing the connection of a network device with a network, using viral communication, are provided. According to the various embodiments, a disconnected network device acts as a simple wireless device and contacts a neighboring network device to obtain configuration information. The request can be forwarded to a network management station (NMS) through one or more neighbors of the disconnected network device. Connectivity is obtained by executing the configuration instructions obtained from the NMS.

10 Claims, 3 Drawing Sheets

METHOD AND SYSTEM FOR RE-ESTABLISHING COMMUNICATION LINK IN A NETWORK BY USING VIRAL COMMUNICATION

BACKGROUND OF THE INVENTION

1. Field of Invention

Embodiments of the invention relate in general to viral communication. More specifically, the embodiments of the invention relate to methods and systems for re-establishing connections in the network by using viral communication techniques.

2. Description of the Background Art

Due to various catastrophic events, communication in various parts of the network is affected, and sometimes a network device is disconnected with the network. To revive the communication links of the disconnected network device, a visit to the network device is required. Each visit to the network device places an extra burden on the maintenance account of the network. Additionally, it is often realized that the network device simply needs to be rebooted for its revival. Further, in conventional methods of reviving disconnected network devices, network management is central and therefore non-optimal.

According to a conventional method, some access points (APs) obtain configuration updates through an aggregation router where a management application resides. The aggregation router manages and provides configuration information to the managed APs as well as access control to the users at the APs. The aggregation router and the APs are connected using Internet protocol (through layer 3). For redundancy purpose, two or more aggregation routers can be deployed. If one fails, APs can re-establish an IP relationship with another aggregation router.

According to another conventional method to re-establish connection between a disconnected network device with the network, the disconnected network device reverts to a last known working configuration in the case of lost connectivity. In this case, it is assumed that the loss of connectivity is due to mis-configuration of the disconnected network device (and the physical connectivity always exists). However, this method does not enable the disconnected network device to regain connectivity to the network when the actual connection (e.g., the physical link) is lost. In addition, this method also requires that a recovery configuration be persistently stored in a specified memory. The recovery configuration is typically a small bootup configuration to regain initial connectivity to a management application. Unless the amount of memory for recovery configuration is large enough to store the operational configuration and is backed up constantly, there can be loss in configuration after restoration of the connection.

DETAILED DESCRIPTION OF EMBODIMENTS OF THE INVENTION

For the sake of convenience, the term 'viral communication', which is used to describe various embodiments of the invention is defined below. However, it should be understood that this definition is provided to merely aid the understanding of the description, and the definition in no way limits the scope of the invention. In an embodiment of the invention, viral communication is defined as a communication architecture where elements are independent, scalable, and where each new element adds capacity to the system, so that it can be adopted incrementally from a small base, and gains accelerating value with scale.

Various embodiments of the invention provide a method and a system for re-establishing the connection of a disconnected network device with a network by using viral communication. The method involves reviving a disconnected network device by establishing a wireless connection with a neighboring network device, using the viral communication technique. The connection of the neighboring network device with the network is used to communicate with a management station to obtain configuration information. The configuration information includes instructions for re-configuring the disconnected network device. The execution of the received configuration instructions re-establishes the connection of the disconnected network device.

Figure 1:
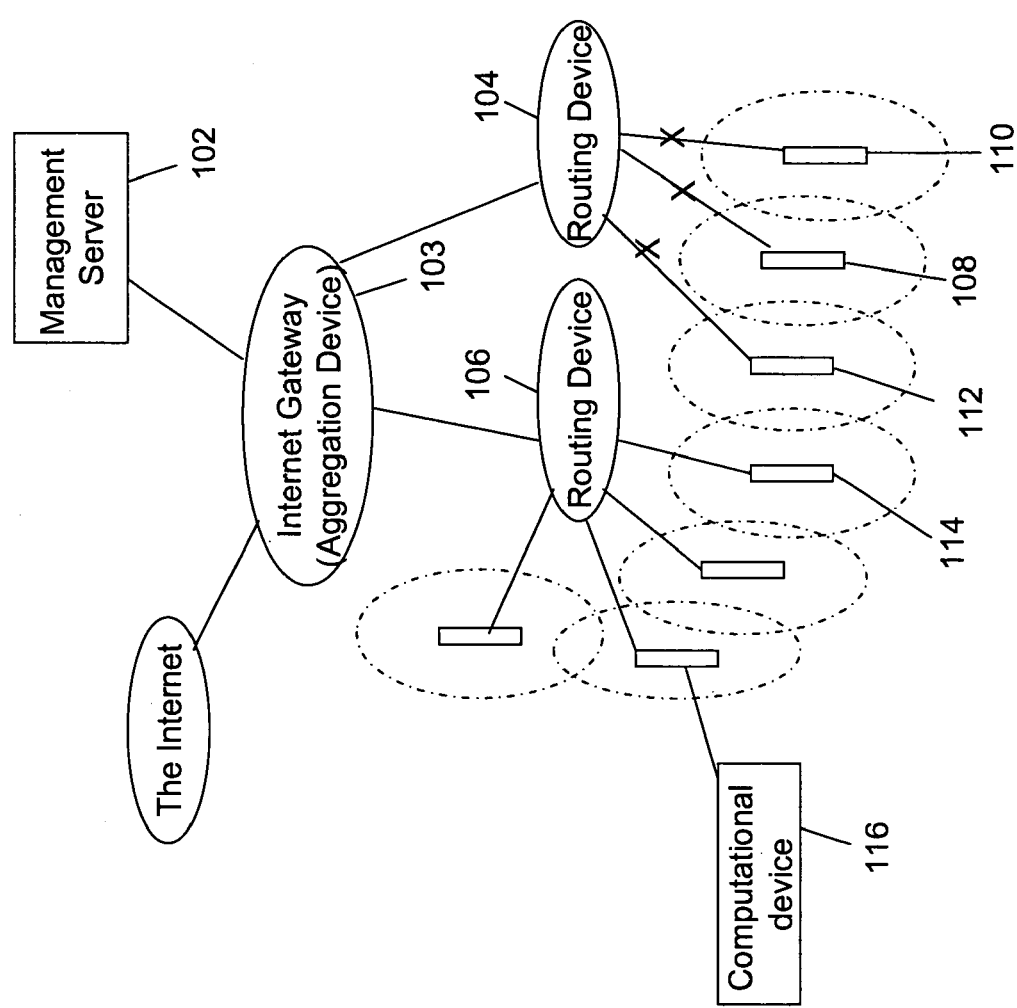
FIG. 1 is an exemplary environment in which the invention works, in accordance with an embodiment of the invention.

FIG. 1 is an exemplary environment in which the invention works, in accordance with an embodiment of the invention. The exemplary embodiment shows a management server 102 connected to a routing device 104 and a routing device 106. According to various embodiments of the invention, management server 102 contains the management application for the network. Thus, management server 102 can also be called as network management station (NMS). In addition, management server 102 can be connected to multiple network devices that are similar to routing device 104. According to an embodiment of the invention, management server 102 can co-reside with an Internet gateway 103 at a point of presence (PoP). An example of Internet gateway can be Cisco's C6500.

In various embodiments of the invention, routing devices 104 and 106 can be access routers such as Cisco's C1700, gateway routers, and the like. Furthermore, routing devices 104 and 106 are connected to network devices 108, 110, 112, and 114. According to an embodiment of the invention, network devices 108, 110, 112, and 114 can be wireless access points (WAP). A WAP can serve at least one wireless device 116. A wireless device can be a personal computer, a laptop, a personal digital assistant (PDA), or any other similar computing device that is capable of wireless communication. A group of similar WAPs can aggregate at routing device 104 to access the Internet through Internet gateway 103.

According to the various embodiments of the invention, network device 108 is managed by a management application running at management server 102. According to an exemplary embodiment of the invention, connection between network device 108 and routing device 104 can break down. In an embodiment, the break down can be a result of a mis-configuration. An example of mis-configuration can be a case where an incorrect IP address is assigned for network device 108. In such cases, as a result of the break down, network device 108 can be unreachable.

Figure 2:
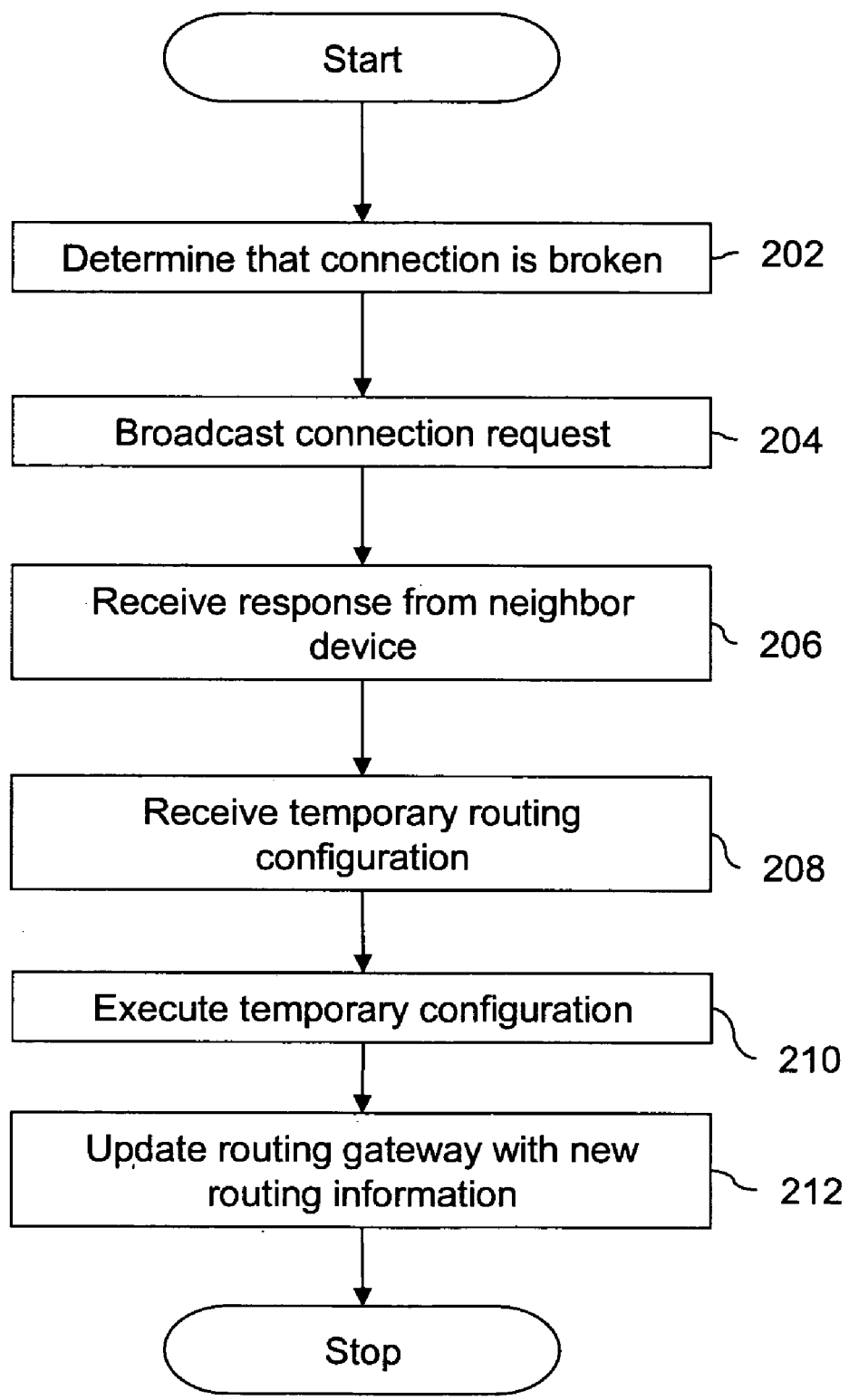
FIG. 2 is a flowchart depicting a method for re-establishing the connection of a network device with a network by using viral communication, in accordance with an exemplary embodiment of the invention.

FIG. 2 is a flowchart depicting a method for re-establishing the connection of network device 108 with a network by using viral communication, in accordance with an exemplary embodiment of the invention. At step 202, network device 108 determines that a connection between network device 108 and routing device 104 is broken. In an embodiment of the invention, the connection to routing device 104 can be a wire-line connection. Also, in an embodiment, network device 108 can detect the break in the connection if a stay-alive signal is not received in a specified time interval. Once break in the connection is determined, the method proceeds to step 204. At step 204, a connection request is broadcast. In an embodiment of the invention, network device 108 broadcasts the connection request to the neighboring network devices. A neighboring network device can be any of the network devices that are within wireless reach of network device 108. In an embodiment of the invention, wireless reach of a network device is the maximum distance within which the network device can transmit and receive wireless communication signals with acceptable performance in term of bit errors, delay, and noise. At step 206, network device 108 receives a response from one of the neighboring network devices. In an embodiment of the invention, the neighboring network device can be network device 112. In an alternate embodiment, if network device 112 is also disconnected from routing device 104, the response to the request can be received from another neighboring network device, which is a neighbor to network device 112. For example, network device 112 can wirelessly communicate connection request to network device 114. The process of communication of one network device to another ensures that the method according to the various embodiments of the invention can be applied recursively, where a disconnected network device can connect to a neighboring network device or a routing device, by hopping through a few intermediate network devices, if necessary. At step 208, temporary routing configuration instructions are received. In an embodiment, network device 108 receives configuration instructions in response to the connection request. The configuration instructions can be sent from the neighboring network device. In an embodiment of the invention, network device 108 receives configuration information from network device 112. Further, network device 112 can also receive configuration instructions from network device 114 if network device 112 has established viral communication with network device 114. According to an embodiment of the invention, the configuration instructions can be in the form of a temporary routing configuration file. In an embodiment, the temporary routing configuration file can be stored in the network device. According to an embodiment of the invention, the temporary routing configuration file can include instructions to reboot. In an alternate embodiment, network device 112 may request configuration instructions on behalf of network device 108 from the network management server 102. In this case, network device 112 does not generate the temporary routing configuration file for network device 108, but forwards it on behalf of network management server 102.

At step 210, received temporary routing configuration instructions are executed. In an embodiment of the invention, network device 108 executes the received temporary routing configuration instructions so as to re-establish connection with the network. Further, network device 112 also executes temporary routing configuration instructions if network device 112 receives temporary routing configuration from network device 114. In an embodiment of the invention, the connection of network device 108 with routing device 106 is established via network devices 112 and 114. All the traffic to and from network device 108 is routed through network device 112. Network device 112 routes the traffic to routing device 106 via network device 114. At step 212, Internet gateway 103 is updated with new routing configuration. In an embodiment of the invention, network device 112 updates Internet gateway 103 with the new routing configuration of network device 108. Similarly network device 114 updates Internet gateway 103 with the new routing configuration of network device 112 if network device 112 has made a temporary connection with network device 114.

According to various embodiments of the invention, Cisco's CNS Agents can be enhanced to provide the required intelligence to network device 108 or router device 106. The intelligence can allow network device 108 to be aware of loss of connectivity between network device 108 and router device 106. When network device 108 is aware of the loss of connectivity, it can perform steps 202 to 212 and use its neighboring network devices in order to receive and execute configuration instructions.

In various embodiment of the invention, steps 202 to 212 can also be implemented by devices other than network device 108. For example other devices can be routing devices, Internet gateways, or any other non-management device. Thus, in various embodiment of the invention, a non-management System/device can be employed for re-establishing communication with a Data Network (e.g., the Internet).

Figure 3:
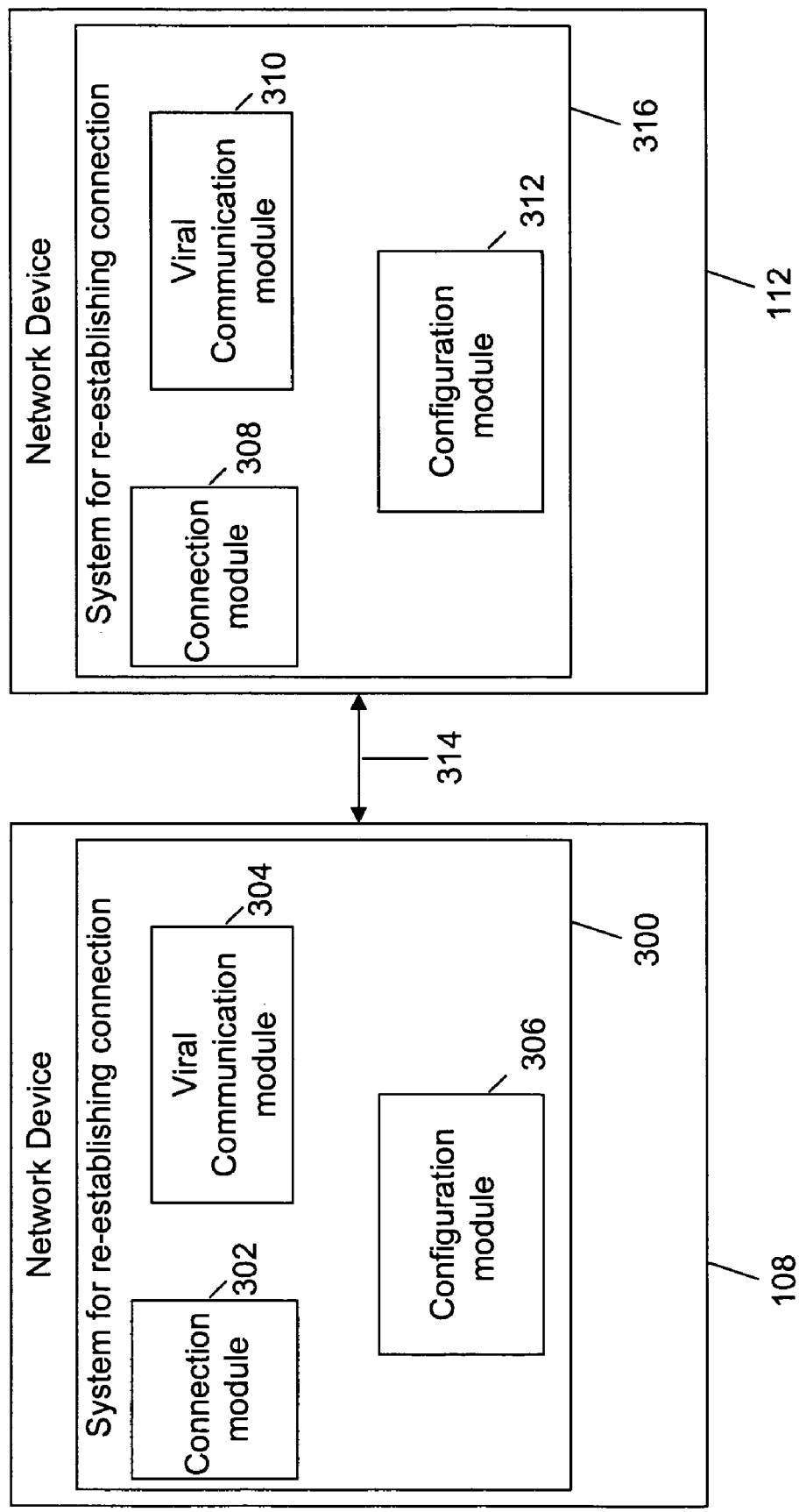
FIG. 3 illustrates a block diagram depicting a connection between network devices, in accordance with an exemplary embodiment of the invention.

FIG. 3 illustrates a block diagram depicting a connection 314 between network device 108 and network device 112, in accordance with an exemplary embodiment of the invention. In an embodiment of the invention, connection 314 can be a wireless connection that can be formed using viral communication techniques. According to an embodiment of the invention, systems for re-establishing connection 300 and 316 can be a part of Cisco's CNS Agents. System for re-establishing connection 300 can reside in network device 108 and system for re-establishing connection 316 can reside in the device through which network device 108 regains connection to the network. In an embodiment of the invention, system for re-establishing connection 316 can reside in network device 112. In another embodiment of the invention, systems for re-establishing connection 300 and 316 can co-exist in the same device. System for re-establishing connection 300 includes a connection module 302, a viral communication module 304, and a configuration module 306. Similarly, system for re-establishing connection 316 includes a connection module 308, a viral communication module 310, and a configuration module 312. Connection modules 302 and 308, viral communication modules 304 and 310, and configuration modules 306 and 312 can be software modules or hardware modules or a combination of both. Connection module 302 identifies the status of the connection between network device 108 and the network in accordance with step 202. In accordance with an embodiment, connection module 302 detects that network device 108 is disconnected by using mechanisms such as time-based detection. In an embodiment of the invention, if a stay-alive signal is not received within the specified time period, the connection is determined to be broken.

Viral communication module 304 generates and sends a request for routing configuration instructions. The request is sent to the neighboring network device. In another embodiment of the invention, viral communication module 304 broadcasts a connection request to the neighboring network devices in accordance with step 204. Thus, by practice of various embodiments of the present invention, viral communication module 310 responds to viral communication request from neighboring devices, and configuration module 312 generates the temporary configuration, or requests the configuration from management server 102, on behalf of the device requesting viral communications. Viral communication module 310 may then send the temporary configuration file to the device requesting viral communications. Further, as previously indicated, viral communication module 304 receives a response from a neighboring network device in accordance with step 206. For example, viral communication module 304 can receive the response from network device 112. In an embodiment of the invention, the response can be generated and sent by viral communication module 310 in accordance with step 206.

Configuration module 312 generates routing configuration instructions in response to the request. In an embodiment of the invention, configuration module 312 can generate the routing configuration instructions in response to the configuration request received by viral communication module 310. Further, configuration module 312 can request the routing configuration instructions from network management server 102 on behalf of network device 108 in accordance with step 208.

Viral communication module 304 can forward the received routing configuration instructions to configuration module 306, in accordance with step 208. Configuration module 306 can execute the received routing configuration instructions in accordance with step 210. In an embodiment of the invention, configuration module 306 configures network device 108. Execution of the routing configuration instructions re-configures network device 108. Once network device 108 is re-configured, it can regain the lost connectivity to the network. Configuration module 306 can further update Internet gateway 103 with the new routing configuration in accordance with step 212.

According to various embodiments of the invention, the method and system as described above can be extended to other elements of the network including access routers, PoP, and network management stations. For example, if an access router dies, one of its directly connected network device can detect the failure of connection, and ask the management server, also called the network management system, to send the required configuration instructions to reboot the router. Thus, each new element (e.g. network device) of a viral architecture creates more value from connection into the network than from operating alone.

In addition, the method according to the various embodiments of the invention does not necessarily require an initial bootstrap to be stored or to be used in the case of lost connectivity. Various embodiments of the invention also have an advantage that the connection with a disconnected network device can be revived by using viral communication. The various embodiments of the invention allow the users to build upon a viral architecture that enables infinite growth and vastly reduced cost of innovation. While using the method, there is no need to visit the disconnected network device physically, to revive the communication link. Moreover, the system for re-establishing connection according to the various embodiments, can work without any central server. Use of viral communication enables redistribution of network management, which reduces the power and space requirements. The re-distribution of network management and even hardware functions reduces the power required at each network device. Also, lighter and cheaper devices can be built that can include additional capabilities by utilizing the saved space. The various embodiments of the invention also re-distribute network management from a vertically integrated system to the end-device (or even end users for handset devices and personal computers), which can be utilized for a better delivery from managed services where special configuration (e.g. security such as VPN) are needed.

Although the invention has been discussed with respect to specific embodiments thereof, these embodiments are merely illustrative, and not restrictive, of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments in some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for re-establishing connection of a disconnected network device with a network using viral communication, the network comprising a plurality of network devices, the method comprising
   determining that a connection between the disconnected network device and the network has been broken;
   sending a viral communication request, the viral communication request being sent for re-establishing connection between the disconnected network device and the network;
   establishing a wireless connection corresponding to a connection request between a neighbor device and the disconnected network device, the neighbor device being one of the plurality of network devices neighboring the disconnected network device;
   receiving at least one configuration instruction in response to the connection request; and
   executing the received configuration instructions, whereby the execution of the configuration instructions re-establishes connection of the disconnected network device with the network.

2. The method of claim 1, wherein sending the viral communication request comprises broadcasting the viral communication request to the plurality of network devices.

3. The method of claim 1, wherein the at least one configuration instruction is generated by the neighbor device.

4. The method of claim 1, wherein the at least one configuration instruction is generated by a network management server.

5. A system for re-establishing connection of a disconnected network device with a network using viral communication, the network comprising a plurality of network devices, the system comprising
   a connection module for establishing a wireless connection between one of the plurality of network devices and the disconnected network device, the one of the plurality of network devices neighboring the disconnected network device;
   a viral communication module for sending a request for configuration instructions and for receiving at least one configuration instruction in response to the request, the request being sent to a plurality of network devices; and
   a configuration module for executing the received configuration instructions, whereby the execution of the configuration instructions re-establishes connection of the disconnected network device with the network.

6. The system of claim 5, wherein the disconnected network device and the neighboring network device is a wireless access point.

7. The system of claim 5, wherein the plurality of network devices can be at least one of a wireless access point, an access router, point of presence (PoP), and a network management station.

8. The system of claim 5, wherein the request module sends the request to the plurality of network devices, the plurality of network devices storing at least one configuration instruction.

9. A system for re-establishing connection of a disconnected network device with a network using viral communication, the network comprising a plurality of network devices, the system comprising
- means for determining that a connection between the disconnected network device and the network has been broken;
- means for sending a viral communication request, the viral communication request being sent for re-establishing connection between the disconnected network device and the network;
- means for establishing a wireless connection corresponding to a connection request between a neighbor device and the disconnected network device, the neighbor device being one of the plurality of network devices neighboring the disconnected network device;
- means for receiving at least one configuration instruction in response to a connection request; and
- means for executing the received configuration instructions, whereby the execution of the configuration instructions re-establishes connection of the disconnected network device with the network.

10. A machine-readable medium including instructions executable by the processor comprising
- one or more instructions for determining that a connection between a disconnected network device and a network has been broken;
- one or more instructions for sending a viral communication request, the viral communication request being sent for re-establishing connection between the disconnected network device and the network;
- one or more instructions for establishing a wireless connection corresponding to a connection request between a neighbor device and the disconnected network device, the neighbor device being one of the plurality of network devices neighboring the disconnected network device;
- one or more instructions for receiving at least one configuration instruction in response to a connection request; and
- one or more instructions for executing the received configuration instructions, whereby the execution of the configuration instructions re-establishes connection of the disconnected network device with the network.

* * * * *